United States Patent
Mossler et al.

(10) Patent No.: US 10,567,375 B1
(45) Date of Patent: Feb. 18, 2020

(54) SYSTEMS AND METHODS FOR DATA ACCESS CONTROL AND ACCOUNT MANAGEMENT

(71) Applicant: Capital One Services, LLC, McLean, VA (US)

(72) Inventors: Lara Mossler, Farmville, VA (US); Baskar Dilli, Austin, TX (US); Melissa Heng, Glen Allen, VA (US); Aravindhan Manivannan, Henrico, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/150,202

(22) Filed: Oct. 2, 2018

(51) Int. Cl.
H04L 29/06 (2006.01)

(52) U.S. Cl.
CPC ........ H04L 63/083 (2013.01); H04L 63/0861 (2013.01); H04L 63/1416 (2013.01); *H04L 2463/082* (2013.01)

(58) Field of Classification Search
CPC .................................................. H04L 63/083
See application file for complete search history.

(56) References Cited

U.S. PATENT DOCUMENTS

| | | | |
|---|---|---|---|
| 7,908,645 B2 | 3/2011 | Varghese et al. | |
| 8,739,278 B2 | 5/2014 | Varghese | |
| 10,051,001 B1* | 8/2018 | Ashley | H04L 63/083 |
| 2008/0101239 A1* | 5/2008 | Goode | H04L 12/4641 370/235 |
| 2009/0132813 A1* | 5/2009 | Schibuk | G06Q 20/223 713/158 |
| 2012/0109821 A1 | 5/2012 | Barbour et al. | |
| 2012/0167162 A1 | 6/2012 | Raleigh et al. | |
| 2013/0262858 A1* | 10/2013 | Neuman | H04L 63/08 713/155 |
| 2015/0073987 A1 | 3/2015 | Dutt | |
| 2016/0087964 A1* | 3/2016 | Irving, Jr. | H04L 63/108 726/4 |
| 2016/0294556 A1 | 10/2016 | Vortriede | |
| 2017/0111335 A1* | 4/2017 | Hibbert | H04L 63/083 |
| 2017/0188232 A1 | 6/2017 | Raleigh et al. | |
| 2017/0331828 A1 | 11/2017 | Caldera et al. | |
| 2018/0097790 A1 | 4/2018 | Caldera et al. | |
| 2018/0121916 A1 | 5/2018 | Ross et al. | |
| 2018/0158037 A1 | 6/2018 | Cassel et al. | |
| 2018/0158137 A1 | 6/2018 | Tsantes et al. | |
| 2018/0176208 A1 | 6/2018 | Lee | |
| 2018/0176214 A1 | 6/2018 | Chhabra et al. | |

* cited by examiner

*Primary Examiner* — William S Powers
(74) *Attorney, Agent, or Firm* — Hunton Andrews Kurth LLP

(57) ABSTRACT

Embodiments of systems and methods for data access control and account management are described. In an embodiment, a server can apply flags to user accounts identified as requiring the user to perform an action or, in the case of potentially compromised access credentials, to offer the user the opportunity to authenticate and create new credentials. A user account database and an access report database can store access credentials, flags, and other relevant information for use by the server to perform various administrative, authentication, and protective actions on user accounts.

20 Claims, 15 Drawing Sheets

API (200)

Database (300)

FIG. 4    Method (400)

Method (500)

Login Interface 610

Application
User Interface (600)

Authentication Interface (620)

Application
User Interface (600)

Protective Action Interface (630)

Application
User Interface (600)

Deflection Interface (640)

Application
User Interface (600)

Additional Action Interface (650)

Application
User Interface (600)

Authentication Interface 720

Web Browser
User Interface (700)

Additional Action Interface 750

Web Browser
User Interface (700)

SYSTEMS AND METHODS FOR DATA ACCESS CONTROL AND ACCOUNT MANAGEMENT

FIELD OF THE INVENTION

This disclosure relates to data and account management, and more specifically, to systems and methods for data access control and account management.

BACKGROUND

Electronic commerce commands an increasingly large share of the global economy, and this trend is accelerating in view of the proliferation of personal computing devices, such as smart phones, smart watches, laptop computers, and tablets. This combination creates demand for access to data, including data for account management, bill payment, and online shopping and other services, and encourages consumers to demand easy and secure access to data while at home, outside the home, and on mobile devices. In response to these demands, organizations that host or manage user accounts are continuously monitoring user accounts and account activity, in order to improve services, provide consumers with new services and new options, and maintain the overall consumer experience.

In addition, securing user accounts and protecting data is growing in importance, particularly protecting financial information and maintaining the integrity of user account access. Hacking attacks aimed at gaining access to accounts and other information are common, and these attacks may be performed by humans or robotically by internet "bots." The term "bot" can refer to a software application created to perform a specific task, and bots can be designed for malicious purposes, such as the submission of stolen login credentials, password guessing attacks, brute force attacks, or other methods of gaining unauthorized access to user accounts. Despite large investments in developing, implementing, and maintaining security measures, data theft and fraud continue to cause damage. Any organization handling or storing sensitive data risks liability for, and incurs significant costs to avoid, breaches or data losses. Breaches or data losses can cause financial and reputational losses, erode consumer confidence in a business, and may attract significant public attention.

Accordingly, there are increasingly important needs to both control access to data while ensuring ready availability to authorized users.

SUMMARY

Therefore, it is an object of this disclosure to describe systems and methods for data access control and account management. Various embodiments describe systems and methods for maintaining data access controls and management accounts based on a real-time flagging of accounts to direct a consumer to a particular experience at log in. For example, the various embodiments include flagging accounts to require a user to take certain actions or to offer a user a promotion or service, to exclude unauthorized access, or to offer a user the opportunity to rehabilitate potentially compromised accounts, or to add a mobile number to an account, or to provide any new flow, experience or custom interface to the user based on the applied flag.

Embodiments of the present disclosure provide a data access control system, comprising: a server containing a login database storing login credentials, the database include user login credentials for a user having an account; and a processor, wherein, upon a determination that the user login credentials are potentially compromised, the processor is configured to: apply a flag to the user login credentials, wherein the flag precludes the user from accessing the account; upon a subsequent submission of the user login credentials, present an authentication procedure to the user; upon successful completion of the authentication procedure, require the user to perform a protective action; and remove the flag applied to the user login credentials upon completion of the authentication procedure and performance of a protective action.

Embodiments of the present disclosure provide a method of data access control upon determining a first client device has submitted potentially compromised login credentials for a user, the method comprising: applying a flag to all login credentials associated with the user in a login credentials database; recording an identifier associated with the first client device into an access report database; directing the first client device to a deflection site; and removing the flag from all login credentials associated with the user upon completion by the user of an authentication procedure and performance by the user of a protective action.

Embodiments of the present disclosure provide a data access control application programming interface (API), programmed to: receive login credentials from a first client device, wherein the login credentials are associated with a user having an account; receive a determination that the login credentials were potentially compromised; upon receipt of the determination that the login credentials were fraudulently submitted, the API is programmed to: record an identifier of the first client device and write the identifier to an access report database; flag all login credentials associated with the user and copy the login credentials to the access report database; and direct the first client device to a deflection site; and upon submission of login credentials associated with the user from a second client device, the API is programmed to: present an authentication procedure on the second client device; require the performance of a protective action on the second client device; and remove the flag from all login credential associated with the user.

DETAILED DESCRIPTION OF EXAMPLE EMBODIMENTS

One aspect of the present disclosure is to provide data access control, and systems and methods to maintain data access control, such as flagging accounts so custom interfaces or experiences or additional products or services can be offered or provided, or to present a mechanism through which legitimate users can re-establish account security.

Figure 1:
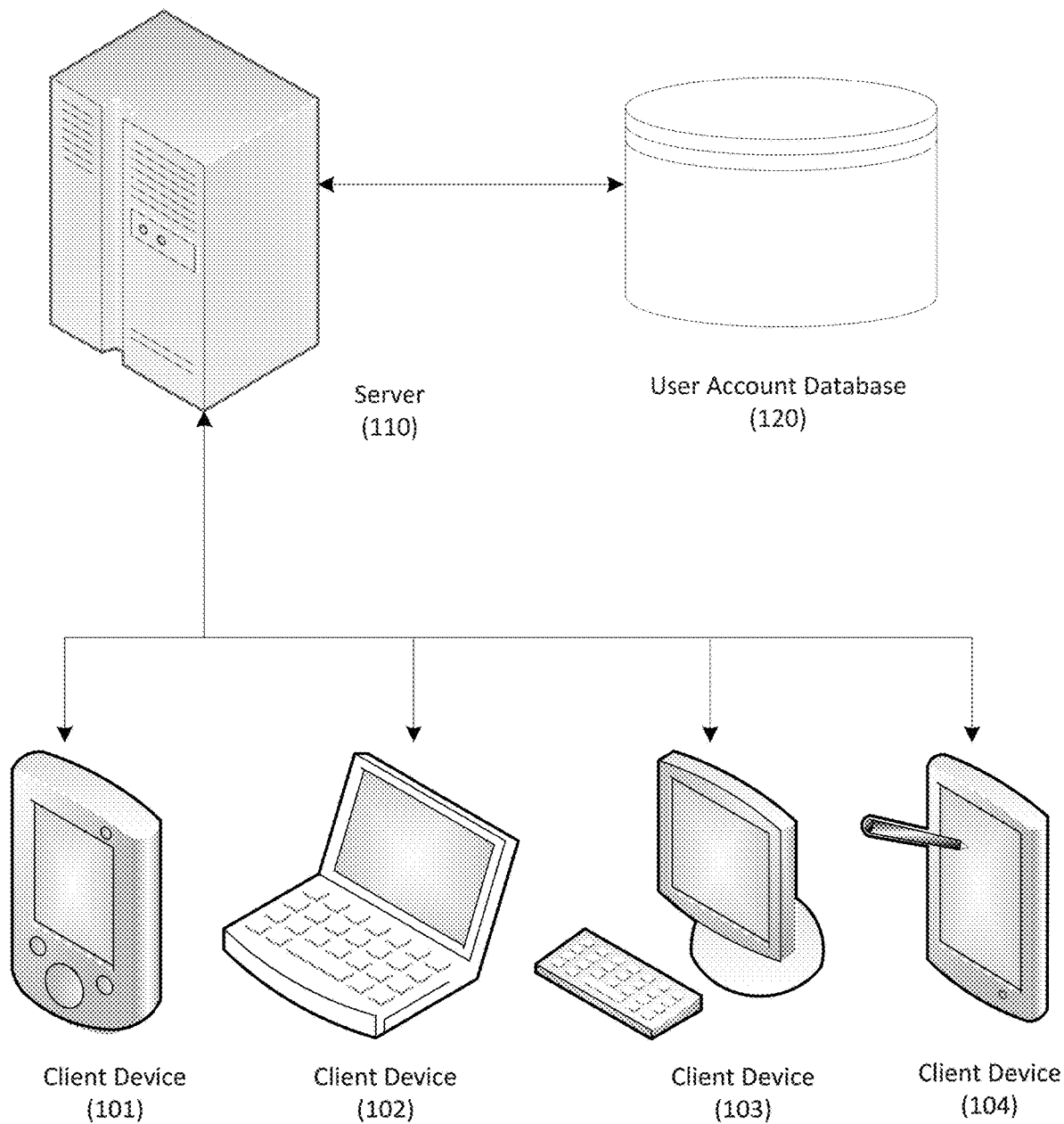
FIG. 1 illustrates a data access control and account management system according to an example embodiment.

FIG. 1 illustrates data access control and account management system 100 according to an example embodiment. In this embodiment, the system includes a plurality of client devices 101, 102, 103, 104, a server 110, and a user account database 120. As shown in FIG. 1, client device 101 may be a smartphone, client device 102 may be a laptop, client device 103 may be a desktop computer, and client device 104 may be a tablet computer. Client devices 101-104 are not limited to these examples, and may be any combination of smartphones, laptop computers, desktop computers, tablet computers, personal digital assistants, thin clients, fat clients, Internet browsers, or customized software applications. It is further understood that the client devices may be of any type of device that supports the communication and display of data and user input. While the example embodiment illustrated in FIG. 1 shows client devices 101-104, the present disclosure is not limited to a specific number of client devices, and it is understood that the system 100 may include a single client device or multiple client devices.

Client devices 101-104 may include a processor and a memory (not shown in FIG. 1). It is understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The memory may be a read-only memory, write-once read-multiple memory or read/write memory, e.g., RAM, ROM and EEPROM, and the client devices 101-104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

Client devices 101-104 may further include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client devices 101-104 may also support a short-range wireless communication interface, such as near field communication, radio-frequency identification, and Bluetooth.

Client devices 101-104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the client devices that is available and supported by the client devices 101-104, such as a touch-screen, keyboard, mouse, cursor-control device, touch-screen, microphone, digital camera, video recorder or camcorder. These devices may be used to enter information and interact with the system 100 as described herein.

The server 110 can be a dedicated server computer, such as bladed servers, or may be personal computers, laptop computers, notebook computers, palm top computers, network computers, mobile devices, or any processor-controlled device capable of supporting the system 100. While FIG. 1 illustrates a single server 110, it is understood that other embodiments may use multiple servers or multiple computer systems as necessary or desired to support the users and may also use back-up or redundant servers to prevent network downtime in the event of a failure of a particular server.

The server 110 can contain a user account database 120. The user account database 120 can be a relational or non-relational database, or a combination of more than one database. In an embodiment, the user account database 120 can be stored by server 110, alternatively the user account database 120 can be stored remotely, such as in another server, on a cloud-based platform, or in any storage device that is in data communication with server 110. The user account database 120 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans). The user account database 120 is not limited to storing login credentials, and can contain data relating to the underlying account.

Any of the client devices 101-104 can submit login credentials for a user to the server 110 in an attempt to gain access to user's account. Upon submission of these credentials, the server 110 can verify the submitted login credentials against the login credentials stored in the user account database 120 to determine if account access should be granted. If the submitted credentials match to the login credentials stored in the user account database 120, the server 110 may grant account access to the submitting client device, and if the submitted credentials do not match, account access may be denied and re-submission of login credentials may be required.

In an embodiment, the server 110 can be configured to apply a flag to the user's account, to login credentials associated with the user's account, or all login credentials associated with the user, or a combination thereof. A flag can be applied for any reason a notification to a user is necessary, including without limitation to manage account servicing (such as to add a mobile number to the account, update an address or legal name associated with the account), offer a new product or service, present a marketing proposal, provide notice of a change in account policy or management, or notify the user of a potential account security issue, to provide a custom interface, a custom application flow, a new experience, etc. The server 110 can be instructed to apply a flag through its own monitoring activities (e.g. via determination that a credential is compromised, or that a mobile number is not of record, or that consent to updated terms is needed, etc.), or through receipt of an instruction to apply the flag from an external source, such as another server or an account monitoring application. The server 110 may, based upon its own monitoring activities provide, in real-time, a flag application instruction for an account via an API, for example. In an embodiment, the flag application instruction can be generated (and provided to an account via an API call) by any department, group, or application within a business organization, regardless of the relationship between that department, group, or application to the server 110 or the direct management or control of the user's account. In some embodiments, one or more common or specific APIs may be made accessible to any department, group, or application, respectively. The server 110 can be configured to check for flags any time a user logs into an account, and server 110 can take action pursuant to any flags applied since the user has last logged in. In some embodiments, more than one flag may have been applied to an account by any one or more of the above techniques, including from across various departments within a business organization, and server 110 may be configured to apply or evaluate one or more rules or priorities to take a singular action pursuant to the highest prioritized or ranked flag upon user login. Any flags not acted on at login may remain with the account to invoke the respect action at subsequent logins.

In an embodiment, the server 110 may receive a determination that login credentials submitted by, for example, the first client device 101, may have been compromised. Examples of potentially compromised login credentials include, without limitation, credential submission involved in human hacking attacks, bot attacks, malware or malicious software (e.g., virus or trojan) attacks, man-in-the-middle attacks, and session hijacking, as well as access attempts using improperly or illegally obtained login credentials such as a keylogging, clickjacking, cookie theft, phishing, bait and switch attacks, social media hacking, and combinations thereof. This determination that login credentials may have been compromised can be made by a companion system to the data access control system 100, by the client for another application, by a server on the same network as the data access control system 100, or other means. The specific operation by which this determination was made is beyond the scope of this disclosure, however, it is understood that data access control system 100 can receive and act upon this determination.

Upon receiving this determination, the data access control system 100 can identify the potentially compromised login credentials in the user account database 120 and apply a flag to those credentials in the database. The flag may be applied with a varying scope within the user account database 120. For example, the flag can be applied only to the specific login credentials submitted by the first client device 101, and in this case, any submission of those can be denied account access when submitted those login credentials. As another example, the flag can be applied to all login credentials associated with the relevant account, and accordingly the relevant account cannot be accessed by the submission of any login credentials. As another example, the flag can be applied to all accounts associated with the relevant user, and in this case none of those accounts may be accessed through the submission of any login credentials. It is understood that, while the term "flag" is used singularly, one or more flags may be applied to one or more records within user account database 120 to implement these restrictions.

The server 110 may remove the flag from the user account database 120 upon the completion of an authentication procedure. Depending upon the scope of the applied flag, upon receipt of a subsequent submission of the flagged login credentials, an attempt to access the account associated with the flagged login credentials, or an attempt to access any of the user's accounts, the server 110 can present an authentication procedure on the requesting client device. The authentication procedure can include the submission of additional identifying information relating to the user or the performance of a specific task, where the information or task is different from the submitted login credentials. For example, the user may be required to, without limitation, answer one or more security questions, enter a security code, answer or act upon a message sent to a registered email account, enter a temporary identification number sent via SMS or MMS message, scan an identification document, and submit a form of biometric identification. Upon successful completion of this authentication procedure, the server 110 may permit access to the relevant account.

In an embodiment, the server 110 may further require the performance of a protective action prior to the restoration of account access. Examples of protective actions can include the establishment of new or different login credentials, the submission of additional identifying information, or the performance of a task. These include, without limitation: adding or changing a password, a user name, an access code, a swipe pattern, and a security question; establishing a new form of biometric authentication; establishing multi-factor authentication by associating at least one of a telephone number, an email address, and a new client device with the account; and a combination thereof. In an embodiment, the server can require the user to associate a telephone number, email address, or new client device that was not previously associated with the account or the user. It is understood that the specific type of authentication required may be adjusted based on the capabilities of the user's client device. The protective action can provide an additional measure of data control, and can reduce the likelihood that subsequent hacking attacks, particularly hacking attacks based on the acquisition or capture of login credentials, will be successful.

In an embodiment, a user may become eligible for certain a product or service or a marketing promotion based on the user's account status or recent account activity. For example, after a certain number of purchases at a retailer, the user may become eligible for a product promotion or a discount code, and the server 110 can be instructed to apply a flag reflecting this status to the user's account. Accordingly, the next time the user logs into his or her account, the server 110 can detect the flag and present a message regarding the promotion or discount code to the user. Optionally, the server 110 can require that the user acknowledge the message by, for example, clicking a button. In the example where a user is awarded a discount code, the flag may instruct the server to add the discount to the user's account and apply it to the user's next purchase.

In an embodiment, a rule or policy concerning the user's account may change, and the server 110 can be notified that a flag should be applied to the user's account so that the user can be notified of this change. Upon the user's next login, the server 110 can present the user with a notification regarding the change, and the server 110 can require the user to acknowledge the notice prior to taking further action. For example, if a security policy change requiring the establishment of multi-factor authentication for all accounts is implemented, a flag can be applied to each account where multi-factor authentication is not yet established. As another example, a user can be required to establish multi-factor authentication within a predetermined time period of creating an account, and a flag can be applied if the time period elapses without multi-factor authentication being established.

In another embodiment, a flag may be placed on the user's account to add a mobile number to the account (that may be used for multi-factor authentication or other notification purposes). Upon login and based on the respective flag, the user may be redirected to an experience for adding a new mobile number or confirming and consenting to adding an existing mobile number to the account. Where a mobile number has been previously received, or is otherwise known, the user experience may be prepopulated with the existing mobile number for user convenience.

In an embodiment, a flag can be placed on the user's account due to account-related activities. For example, if a user establishes an automatic bill payment on a bank account but lacks an overdraft backup account, a flag can be applied to the user's account. When the user next logs in, the server 110 can present the user with a notice regarding overdraft backup accounts and setup information or instructions.

In another embodiment, a flag can be placed on the user's account to provide any custom experience at login, such as to provide a custom interface, or to redirect the user to a new experience (e.g. as part of a pilot program or migration to a new platform) etc. It is understood that the foregoing embodiments are illustrative and are provided as examples of applications of flags to user accounts. The present disclosure is not limited thereto, and instead encompasses any kind of account and flags placed for any reason.

It is further understood that the term "flag," as used herein refers generally to data added to a database as a notification of a certain status or a signal that action should be taken. Known implementations of a software flag, including a variable, a bit field, a bit sequence, a Boolean flag, a database record, or other data structure, are within the scope of the present disclosure.

In an embodiment, multiple flags can be applied to certain login credentials, accounts, or users. In this case, the server 110 can prioritize the flags in order to establish a sequence in which the flags can be addressed. The flags may be prioritized in several manners, including without limitation, time of placement, type of flag, action required by the flag, and the entity requesting application. For example, if the server 110 is prioritizing flags based on time of placement, the first flag placed on the account (or the most recently placed flag) can be assigned the highest priority. As another example, if the server 110 is prioritizing flags based on type of flag, security-related flags (e.g., flags relating to potentially compromised login credentials) or flags requiring user action can be assigned the highest-priority, flags relating to rule or policy changes can be assigned a lower priority, and flags relating to marketing or promotions may have a still lower priority. Once prioritized, the server 110 can address each flag in order, starting with the highest-priority flag. Once all actions for highest-priority flag have been completed, the server 110 can address the flag with the next-highest priority, until all applied flags have been addressed. In some embodiments, a single flag may be addressed or acted upon at each login based on priority, or multiple flags may be acted upon depending on the nature of action taken so as to not overly burden the consumer at login.

In an embodiment, flag application instructions can be received by server 110, and server 110 can apply flags, in real-time. For example, if a certain user action or a certain activity is detected, the server 110 can be instructed to apply a flag as soon as this detection is made. The application of this flag can override previously taken actions, such as a successful login, account setting change, or other action. For example, if a pattern of rapid and/or systematic login attempts consistent with a bot attack has been detected, and a first client device 101 submits user login credentials to server 101 in the same or a similar manner, the user login credentials can be considered potentially compromised, and server 110 can be instructed to apply a flag. In an embodiment, this flag can take precedence of previous logins, and the server 110 can require an authentication procedure and potentially further action, even if the user has already been authenticated and without waiting for a subsequent login attempt. As another example, upon detection of the establishment of an automatic bill payment, the server 110 can be instructed to apply a flag indicating that an overdraft backup account must be set up. The server 110 can require the user to take this action immediately or after a subsequent login.

The communications between server 110 and client devices 101-104, between server 110 and user account database 120, and between server 110 and any other servers or account monitoring applications can be made through an application programming interface (API).

Figure 2:
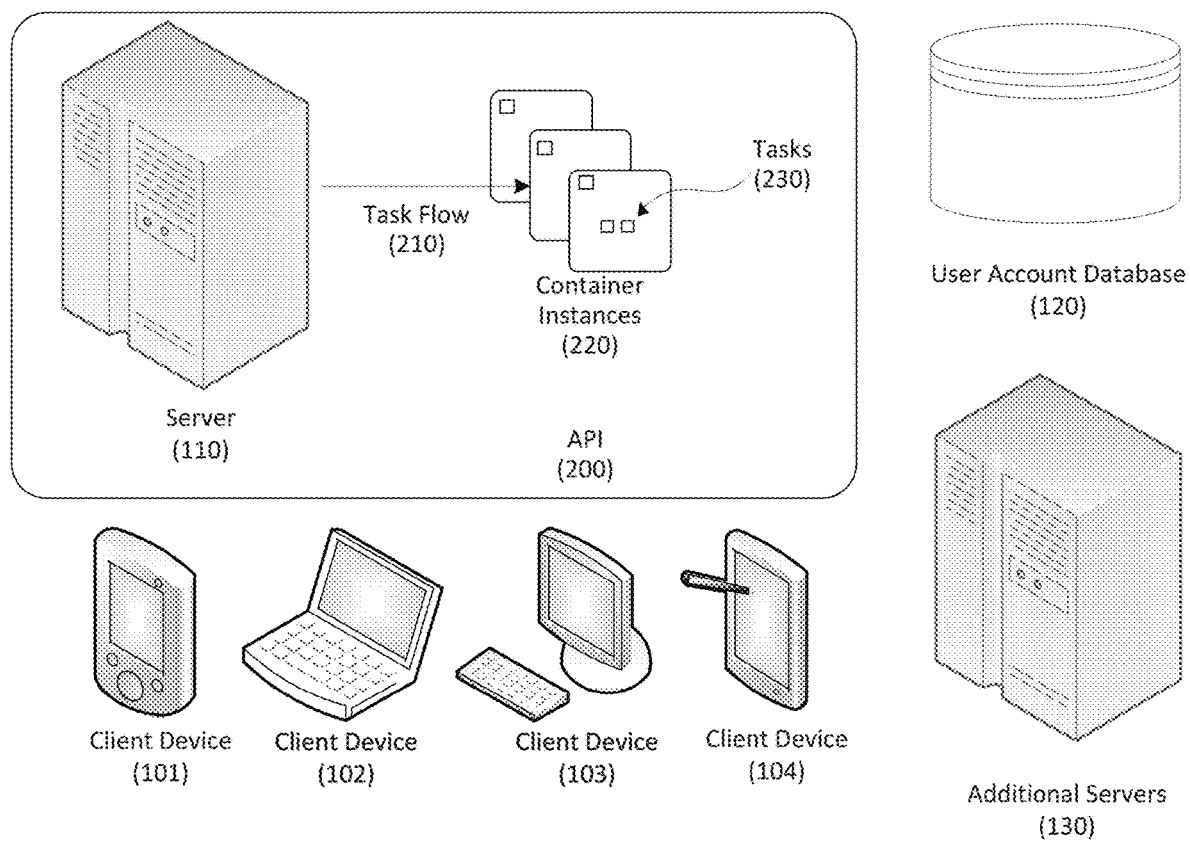
FIG. 2 illustrates an application programming interface handling data access control and account management functions according to an example embodiment.

FIG. 2 illustrates an API 200 that can interface between client devices 101-104, server 110, user account database 120 (which can be contained in server 110), additional servers 130, and account monitoring applications (not shown in FIG. 2). As indicated by the task flow 210, the API 200 can place calls to container instances 220 to perform tasks 230 in connection with client devices 101-104, user account database 120, additional servers 130 and account monitoring applications. It is understood that the API can also be implemented to issue calls to a remote server or application, and such calls can be handled by a framework external to server 110. In an embodiment the API 200 can conform to representational state transfer (REST) principles, i.e., it can be a RESTful API. It is understood that the API 200 can perform any action or interaction described herein as performed by the server 110.

In an embodiment, the server 110 can be in data communication with an access report database. The access report database can be a standalone database containing data related to account access attempts, including access attempts using potentially compromised login credentials or credentials determined to have been fraudulently submitted. For example, upon placement of a flag relating to potentially compromised login credentials, the server 110 can transfer the login credentials to the access report database. The server 110 can transfer only potentially compromised login credentials, all login credentials associated with the user's account, or all login credentials associated with the user, regardless of account. In addition, the server can record one or more network identifiers relating to the client device that submitted the login credentials. The network identifiers can include, without limitation, an internet protocol address, a media access control address, a hardware address, an internet packet exchange address, and a netmask relating to the client device, or a combination thereof. Upon removal of the flag associated with the potentially compromised login credentials, the login credentials can be transferred from the access report database to the user account database 120. In another embodiment, the access report database may be contained within user account database 120.

Figure 3:
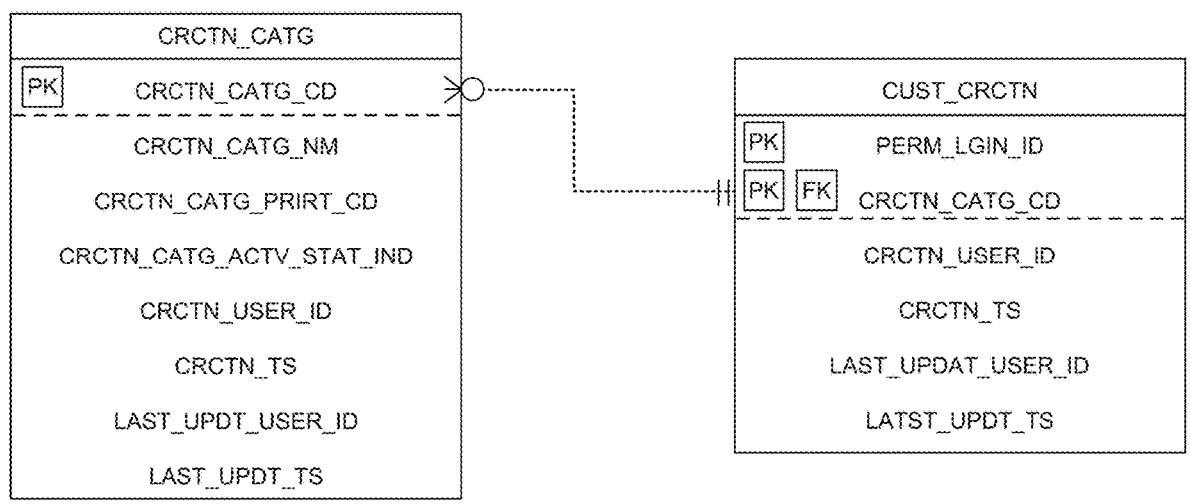
FIG. 3 illustrates a database schema for an access report database according to an example embodiment.

FIG. 3 illustrates the database schema of an access report database 300 according to an embodiment. The access report database 300 can include one or more correction tables containing data relating to account access attempts and the account or accounts involved in the access attempts. The access report database 300 can include one or more correction table, and in the example embodiment shown in FIG. 3, the access report database 300 includes two correction tables, CRCTN_CATG and CUST_CRCTN. Correction table CRCTN_CATG can contain a plurality of fields relating to the category of correction required following the access attempt. These fields include a correction category code CRCTN_CATG_CD, a correction category name CRCTN_CATG_NM, a correction category priority code CRCTN_CATG_PRIRT_CD, a correction category active status indicator CRCTN_CATG_ACTV_STAT_IND, a correction user identifier CRCTN_USER_ID, a correction time stamp CRCTN_TS, an identifier for the last updating user LAST_UPDT_USER_ID, and a last update timestamp LAST_UPDT_TS. Correction table CUST_CRTN can contain a plurality of fields relating to the customer associated with the account or accounts involved in the access attempts. These fields include a customer digital profile identifier PERM_LGIN_ID, a correction category code CRCTN_CATG_CD, a correction user identifier CRCTN_USER_ID, a correction time stamp CRCTN_TS, an identifier for the last updating user LAST_UPDT_USER_ID, and a last update timestamp LAST_UPDT_TS.

In an embodiment, correction category code CRCTN_CATG_CD can be the primary key for the correction table CRCTN_CATG and the customer digital profile identifier PERM_LGIN_ID can be the primary key for the customer table CUST_CRTN. As shown in FIG. 3, the correction category code CRCTN_CATG_CD can also be the foreign key linking the correction table CRCTN_CATG and the customer table CUST_CRTN.

It is understood that FIG. 3 is exemplary, and other embodiments of access report databases are not limited thereto. It is further understood that the access report database can store the data required to perform the functions described herein, in the same fields illustrated in FIG. 3 or in different fields.

In an embodiment, the server can employ the information stored in the access report data to direct a client device submitting potentially compromised login credentials to a deflection site, different from the primary site through which a user can access account data. In contrast, the deflection site can be a look-alike site or can have a design that is distinct from the primary site, but unlike the primary site, the deflection site can have no access to user account data. The server can be instructed to direct a client device to a deflection site automatically upon detection of the relevant network identifiers or login credentials stored in the access report database. Alternatively, the server can be instructed to direct a client device to a deflection site upon application of flag.

Figure 4:
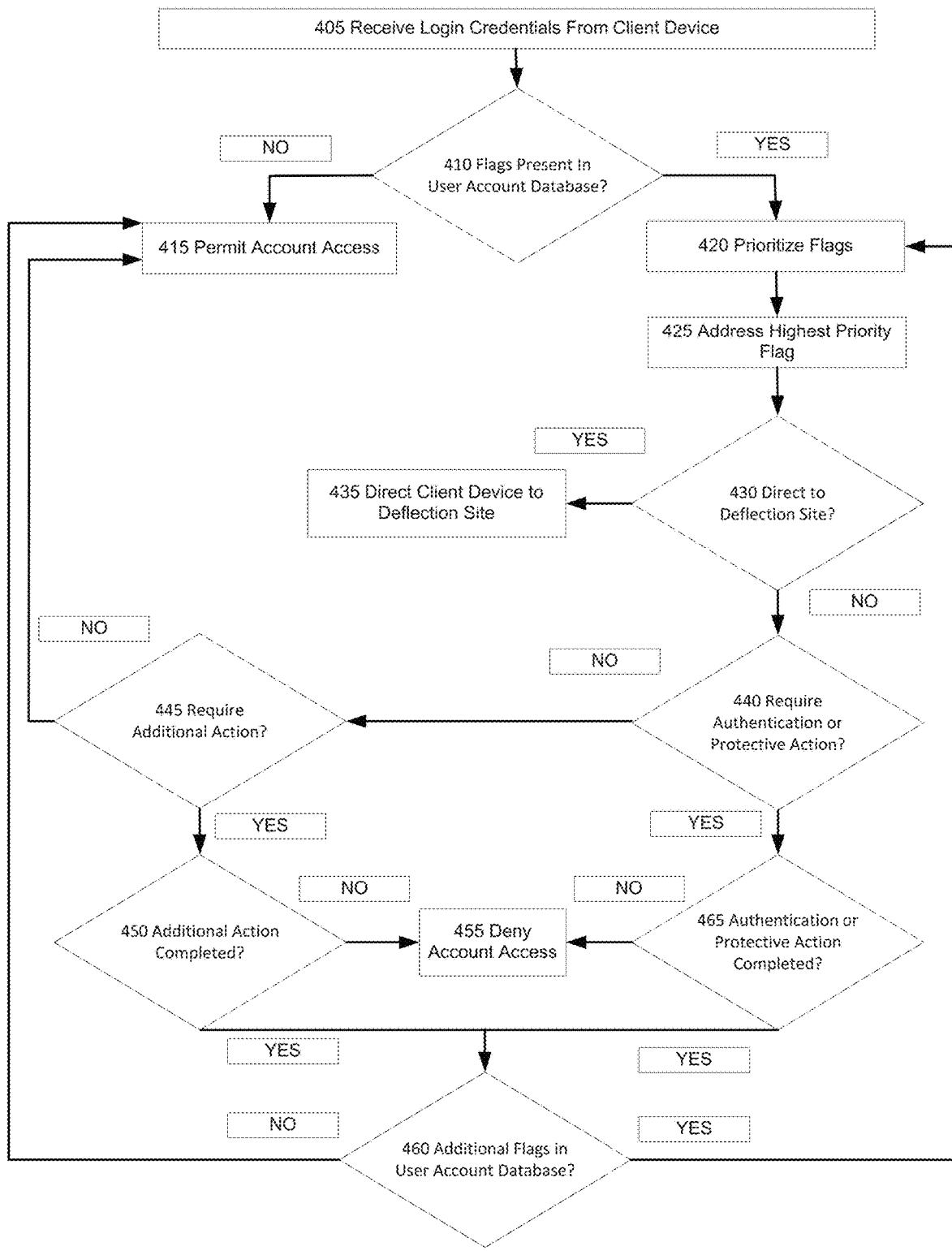
FIG. 4 illustrates a flow chart for a method of handling an access request according to an example embodiment.

FIG. 4 is a flow chart illustrating an example embodiment of a method of handling an access request. The method illustrated in FIG. 4 can begin upon receipt by the server of login credentials from a client device in step 405. Upon receipt of these credentials, the server can determine if any flags have been applied to the received login credentials, and/or to any login credentials or accounts associated with the relevant user, in the user account database (step 410). During step 410, the server can detect flags placed prior to, or contemporaneously with, the receipt of the login credentials.

If during step 410 the server determines that no flags are present in the user account database, the method can advance to step 415 and the user can be permitted to access the account (step 415). Alternatively, if during step 410 the server determines that one or more flags are present, the method can advance to step 420, where the server can prioritize the applied flags to determine the sequence in which they are addressed. Once the flags are prioritized, the method can advance to step 425 where the server will address the highest-priority flag. In this embodiment, the server has assigned the highest priority to a security-related flag and accordingly, during step 430, the server can determine whether the applied flag requires the client device be directed to a deflection site. If so, the server directs the client device to a deflection site (step 435) and if not, the method can advance to step 440.

During step 440, the server can determine whether the flag requires the performance of an authentication procedure, a protective action, or both. Exemplary authentication procedures can include, without limitations, the submission of additional identifying information relating to the user or the performance of a specific task. Exemplary protective actions can include, without limitation, the establishment of new or different login credentials, the submission of additional identifying information, and the performance of a task. If not required, the method can advance to step 445.

During step 445, the server can determine whether the flag requires the performance of an additional action, separate from the authentication procedure and protective action. An additional action can be any task, acknowledgement, submission, or other act related to the user's account. Exemplary additional actions can include, without limitation, the submission of security information (e.g., adding a security question), acknowledging a message (e.g., clicking "OK" on a message window), configuring an account (e.g., establishing multi-factor authentication or electing paper or electronic delivery of account statements), and completing an account requirement (e.g., adding a beneficiary or updating an expired credit card). If no additional action is required, the method can advance to step 415 and permit account access. In an alternative embodiment, upon completion of step 445 with a determination that the flag does not require any additional action, the method can advance to step 460 and confirm that no additional flags have been applied prior to permitting account access.

If during step 445 the server determines that the flag requires an additional action, the method can advance to step 450 where the server can present additional information or tools relating to the additional action to the user's client device. If the additional action is mandatory, the method can advance to step 455 and the server can deny access to the account if the additional action is not completed successfully, or the server can leave the additional action pending until the user completes the action. If the additional action is not mandatory, the method can advance to step 460 (discussed below), if the user declines to complete the action.

Upon successful completion of the additional action in step 450, the method can advance to stop 460, where the server checks whether additional flags are applied. At this point, the server can locate flags placed prior to the receipt of the login credentials from the client device as well as flags placed afterwards. If no flags are located, the method can advance to step 415 and permit account access. If flags are located, the method can return to step 420 and prioritize the remaining flags before addressing them.

Returning to step 440, flag can require that an authentication procedure and/or a protective action be performed. If so, the method can advance to step 465, where the authentication procedure and/or protective action can be performed. If the authentication procedure and/or protective action is not completed successfully, the method can advance to step 455 and the server can deny account access. If the authentication procedure and/or protective action is completed successfully, the method can advance to step 460 and proceed as described above.

In an embodiment not illustrated in FIG. 4, a flag can require the performance of an additional action upon successful completion of an authentication procedure and/or protective action. In this case, the method can advance from the completion of step 465 to step 445.

Figure 5:
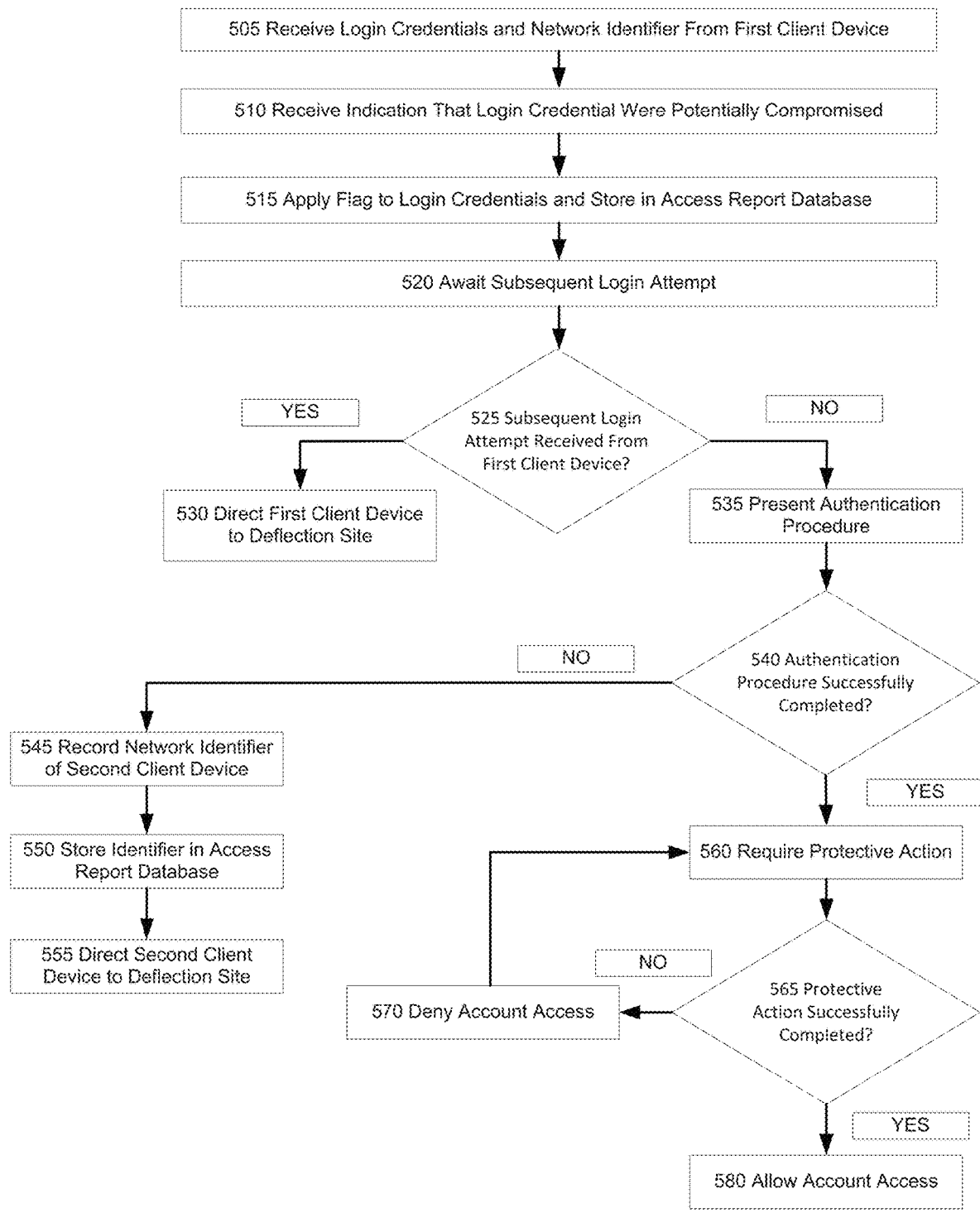
FIG. 5 illustrates a flow chart for a method of handling an access request involving potentially compromised login credentials according to an example embodiment.

FIG. 5 is a flow chart illustrating an example embodiment of a method of handling an access request involving potentially compromised login credentials. Like the method illustrated in FIG. 4, the method illustrated in FIG. 5 can begin upon receipt by the server of login credentials submitted from a first client device in step 505, and in this step the server 110 can also receive one or more network identifiers (e.g., an internet protocol address, a media access control address, a hardware address, an internet packet exchange address, and a netmask relating to the client device) relating to the first client device. The method can advance to step 510, and the server can receive an indication that the submitted login credentials are potentially compromised. The indication can be sent by another server, a monitoring application, or other account tracking process. The server can accordingly apply a flag to the submitted login credentials, all login credentials associated with the account, or all login credentials associated with the user, and store the login credentials and the one or more network identifiers in the access report database (step 515). Then the method can advance to step 520 where the server can await a subsequent attempt to login to the user's account.

Upon receipt of a subsequent access attempt, the server can determine whether the attempt was submitted by the first client device, based on the one or more network identifiers stored in the access report database (step 525). If so, the method can advance to step 530 and the server can direct the first client device to a deflection site. If the server determines the login attempt was made by a second client device, i.e., a device other than the first client device, the method can advance to step 535 and the server can present an authentication procedure to the second client device. If the server determines that the authentication procedure is not successfully completed (step 540), the method can advance to steps 545, 550, and 55, where the server can record one or more network identifiers of the second client device (step 545), store the network identifier in the access report database (step 550), and direct the second client device to a deflection site (step 555).

Returning to step 540, if the server determines the authentication procedure was successfully completed, the method can advance to step 560 and the server can require that the user complete a protective action. If the server determines that the protective action is not completed successfully (step 565), the method can advance to step 570 and the server can deny account access. In an embodiment, the method can return to step 560 and the server can present the protective action requirement again, and this process can be repeated multiple times if necessary. If, during step 565, the server determines the protective action is completed successfully, the method can advance to stop 580 and allow account access.

It is understood that alternative embodiments of the method 500 illustrated in FIG. 5 exist. For example, the flag applied to the login credentials can override the determination at step 525 and advance the method to step 535 so that the server can present an authentication procedure to first client device. In another alternative embodiment, instead of waiting for a subsequent login attempt (step 520) the server can notify the user through a communication means associated with the account (e.g., an email address or a phone number) that their credentials are potentially compromised and proceed to an authentication procedure (step 535).

FIGS. 6A-6E illustrate a series of application user interfaces of a user's client device according to example embodiments. The application user interface 600 shown in these figures may be displayed on a smartphone, tablet computer, laptop computer, desktop computer, or any other client device where a credit management application has been installed or can be deployed. In an embodiment, the application user interface 600 may be adapted to a mobile client device, including a smart phone and a tablet computer. In another embodiment, the application user interface 600 may be adapted to a client device with more system resources, including a laptop computer or desktop computer.

Figure 6A:
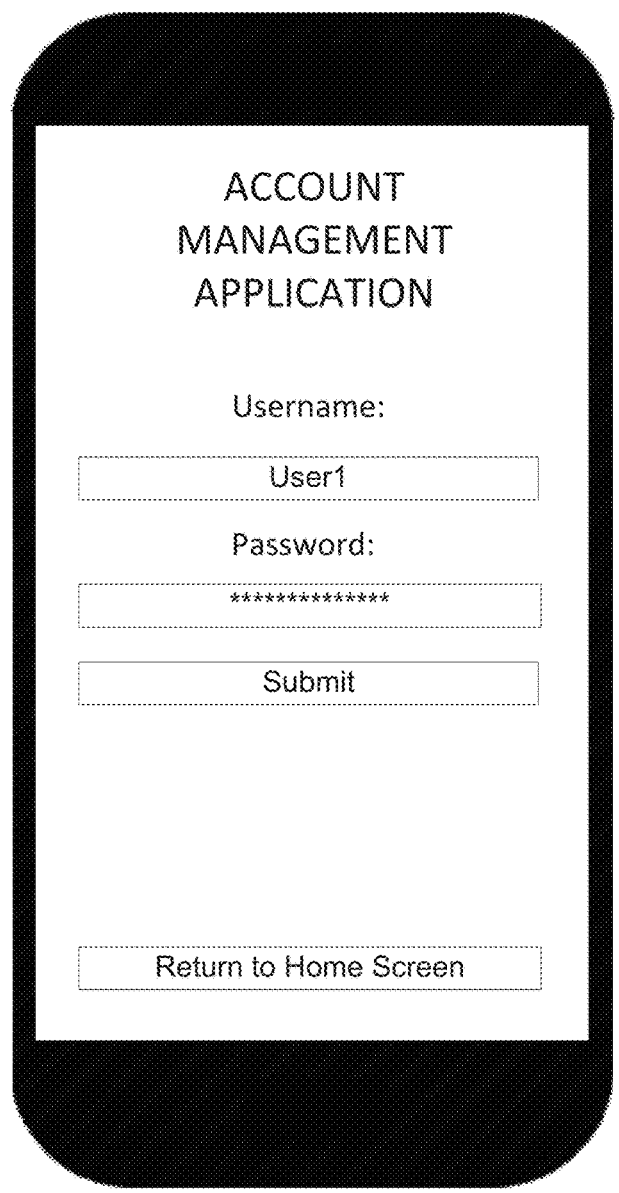
FIGS. 6A-6E illustrate a series of application user interfaces according to example embodiments.
Figure 6B:
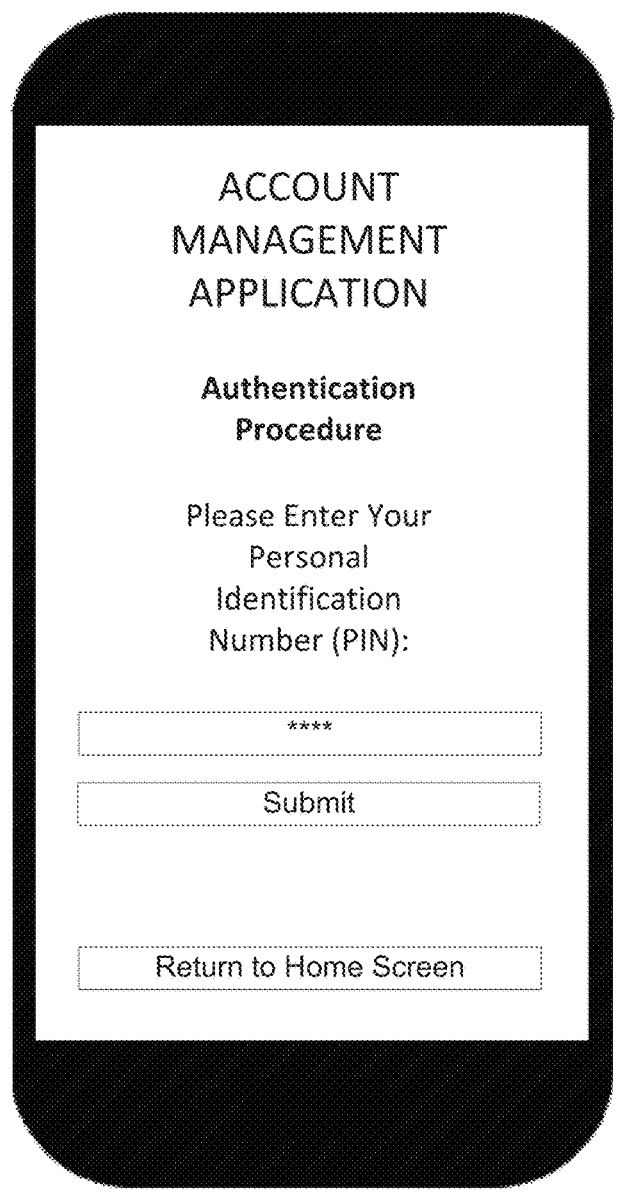
Figure 6C:
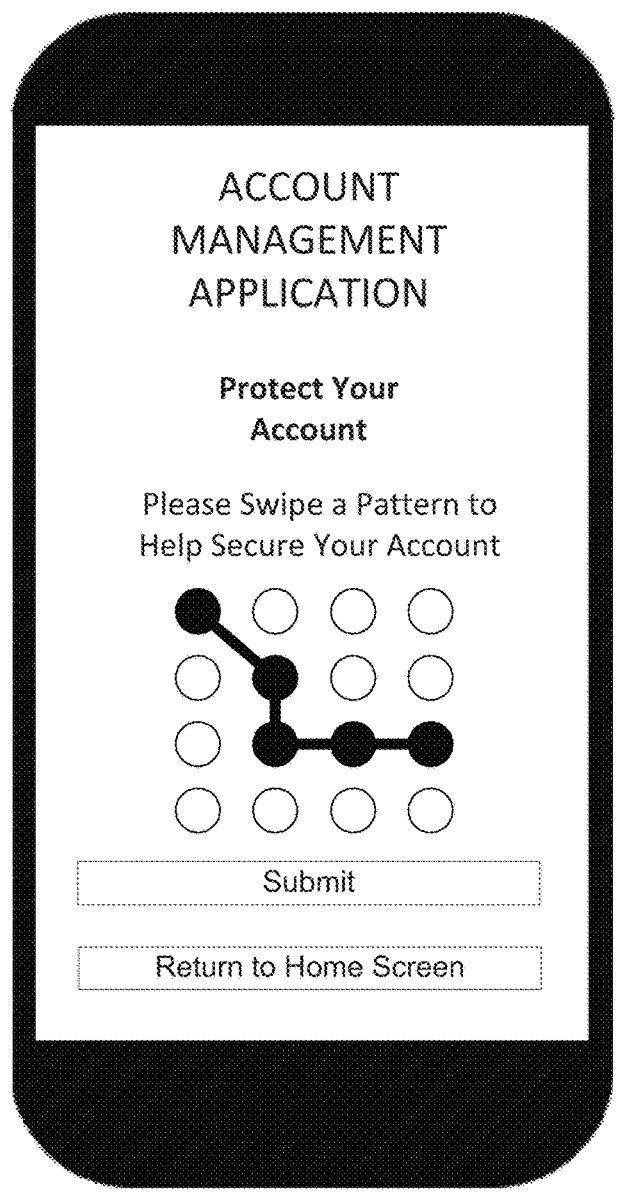

As shown in FIG. 6A, the application user interface 600 can present a login interface 610 on the display of the user's client device. The login interface 610 can allow the user to access account information by the submission of a password as illustrated, or by another known authentication method. FIG. 6B shows an authentication interface 620, which can be displayed as part of an authentication procedure in response to a flag applied to the user's login credentials. In a further embodiment, the login interface 610 and the authentication interface 620 can present options of various methods of logging in or authentication and allow the user to select a method from the options presented. FIG. 6C shows a protective action interface 630, which can be displayed as part of a protective action procedure. The server can require the user to complete the protective action procedure prior to granting account access. In a further embodiment, the protective action interface 630 can present options of various protective actions for selection by the user.

Figure 6D:
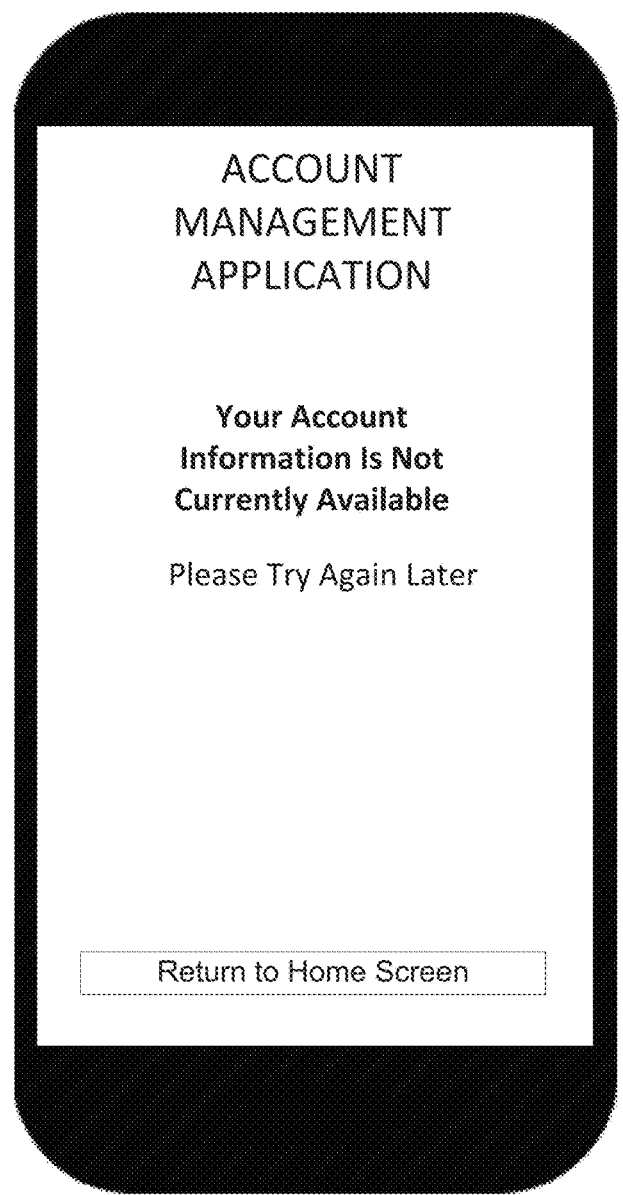

FIG. 6D shows a deflection interface 640, which can be displayed when the server directs a client device away from viewing account information due to, e.g., the submission of potentially compromised login credentials. The deflection interface 640 does not provide a path or option for the user to access account information.

Figure 6E:
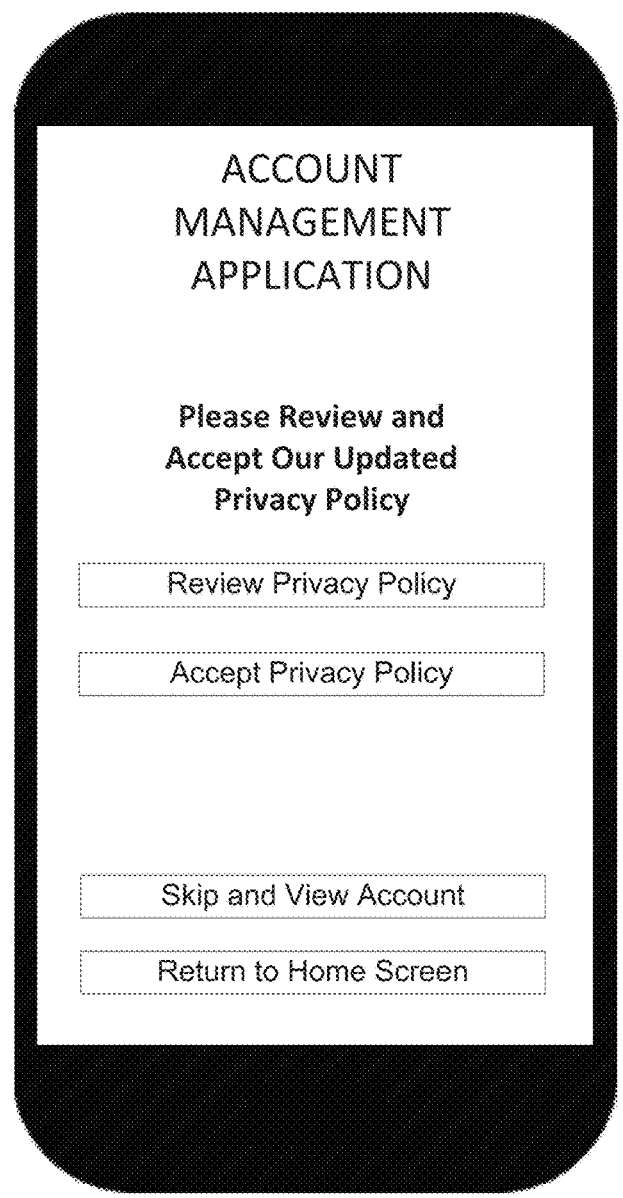

FIG. 6E shows an additional action interface 650, which can be displayed in response to a flag requiring the user complete an additional action. In an embodiment, the additional action can be optional, and the additional action interface 650 can provide an option for the user to bypass the additional action and access the account.

FIGS. 7A-7E illustrate a series of application user interfaces of a user's client device according to example embodiments. The web browser user interface 700 shown in these figures may be displayed on a smartphone, tablet computer, laptop computer, desktop computer, or any other client device where a web browser has been installed or can be deployed. In an embodiment, the web browser user interface 700 may be adapted to a mobile client device, including a smart phone and a tablet computer. In another embodiment, the web browser user interface 700 may be adapted to a client device with more system resources, including a laptop computer or desktop computer.

Figure 7A:
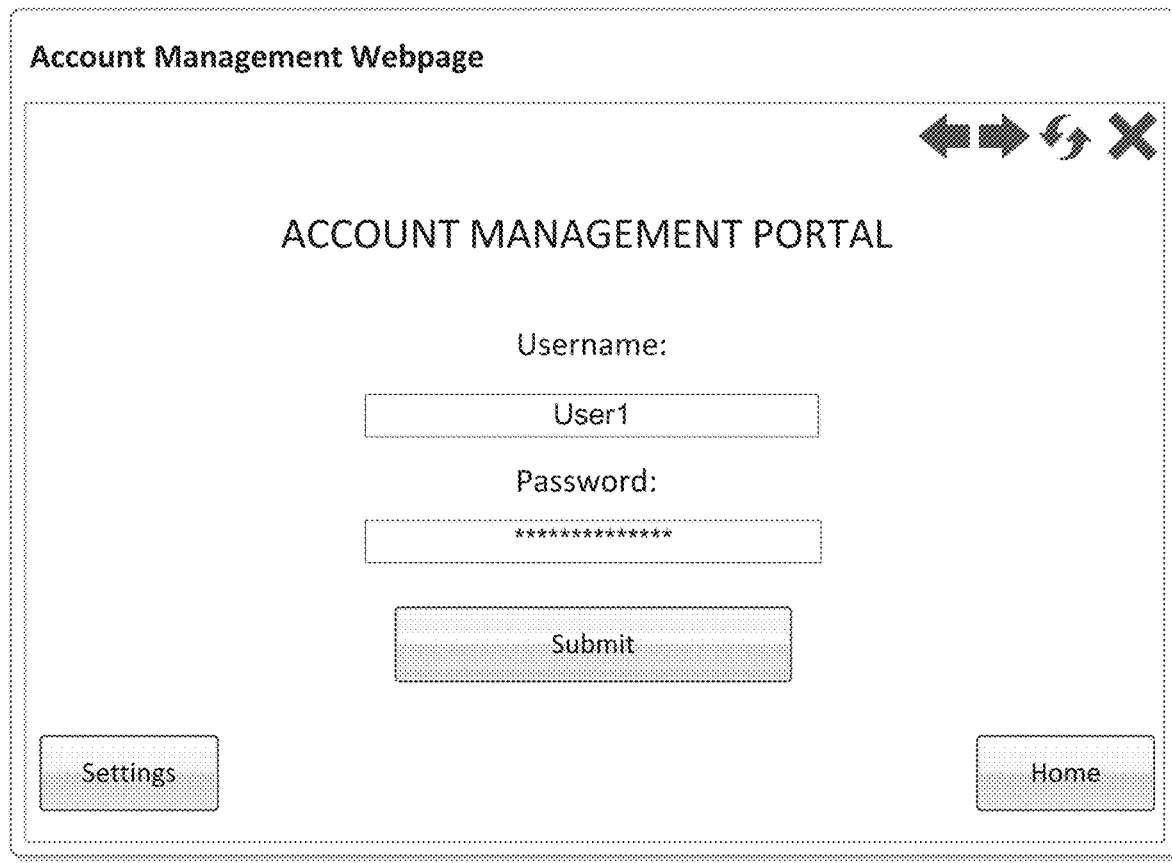
FIGS. 7A-7E illustrate a series of web browser user interfaces according to example embodiments.
Figure 7B:
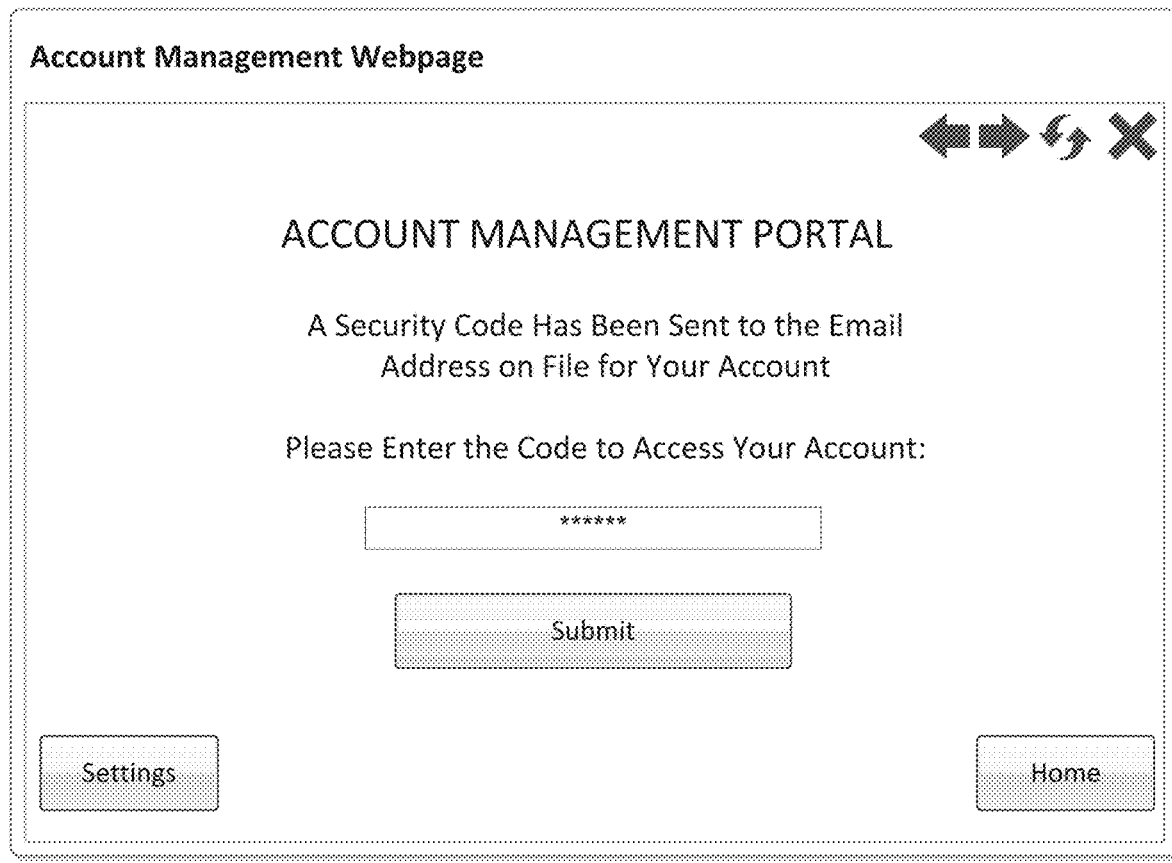

As shown in FIG. 7A, the web browser user interface 700 can present a login interface 710 on the display of the user's client device, which can allow the user to access account information. FIG. 7B shows an authentication interface 720 that can be displayed when a flag applied to the user's login credentials requires the performance of an authentication procedure. Like login interface 610 and the authentication interface 620, in a further embodiment the login interface 710 and the authentication interface 720 can present options of various methods of logging in or authentication and allow the user to select a method from the options presented.

Figure 7C:
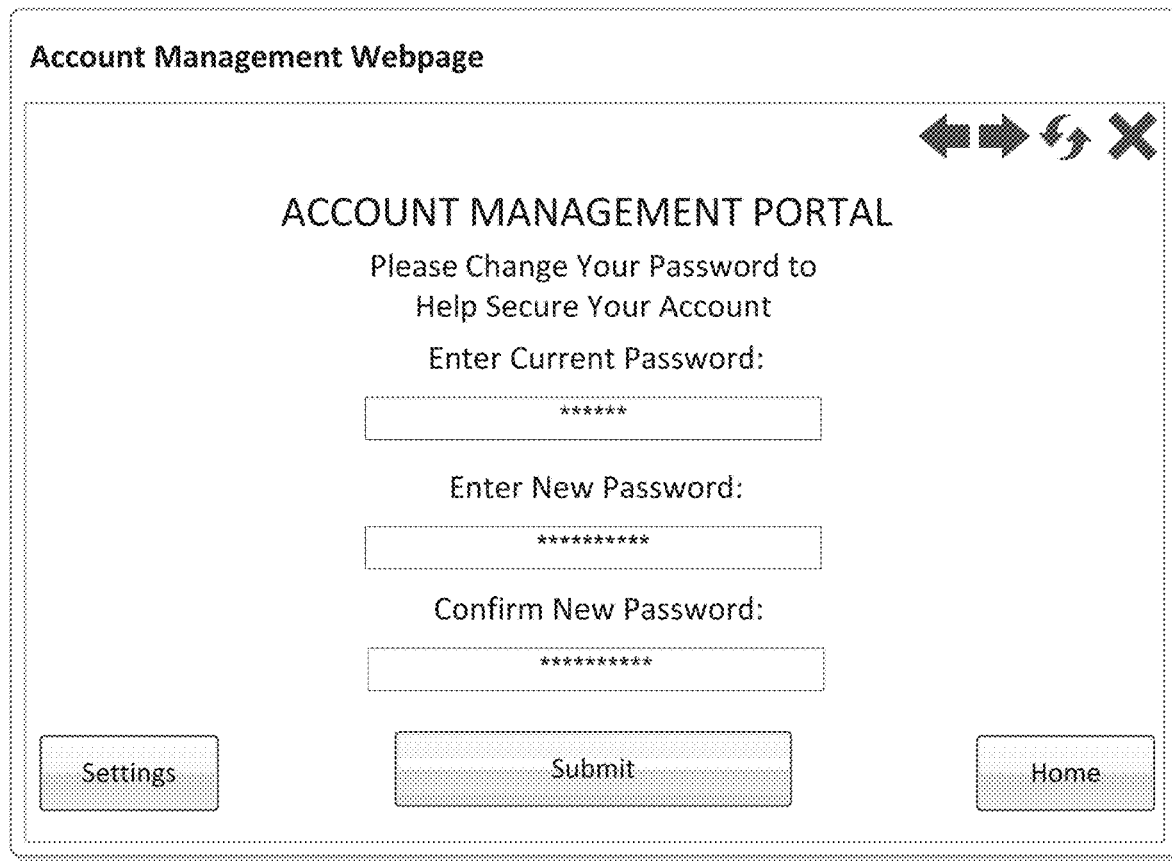

FIG. 7C shows a protective action interface 730 that can be displayed during a protective action procedure. The server can require the user to complete the protective action procedure prior to granting account access. In a further embodiment, the protective action interface 730 can present options of various protective actions for selection by the user.

Figure 7D:
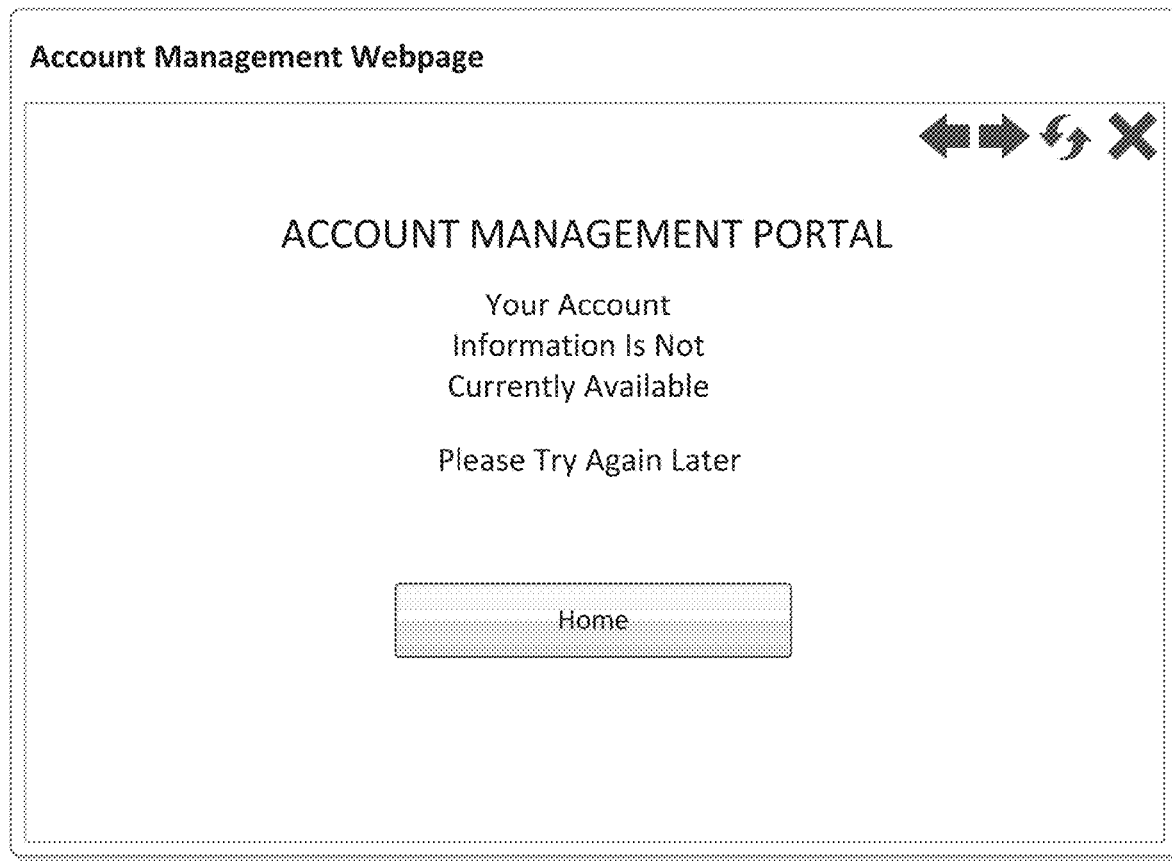

FIG. 7D shows a deflection site interface 740, which can be displayed when the server directs a client device away from viewing account information due to, e.g., the submission of potentially compromised login credentials. The deflection site interface 740 does not provide a path or option for the user to access account information.

Figure 7E:
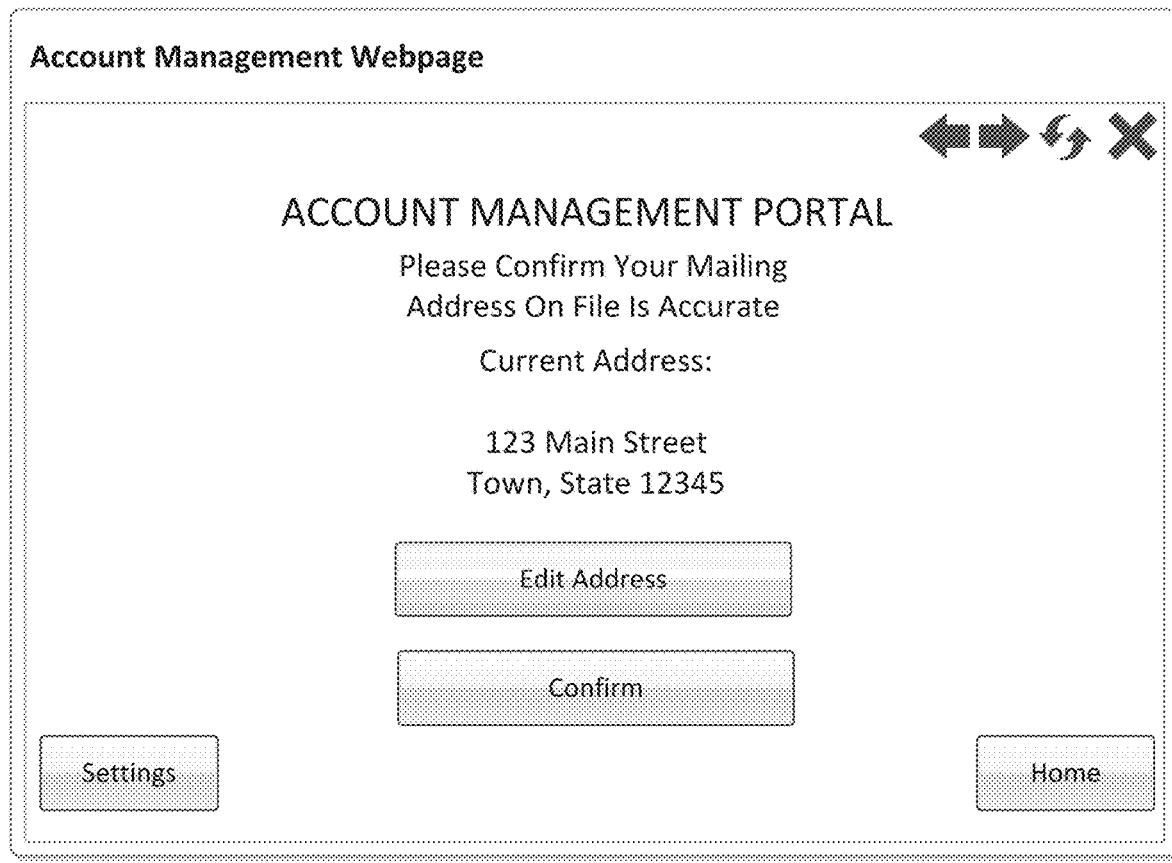

FIG. 7E shows an additional action interface 750, which can be displayed in response to a flag requiring the user complete an additional action. In an embodiment, the additional action can be optional, and the additional action interface 750 can provide an option for the user to bypass the additional action and access the account.

Embodiments of the present disclosure are not limited to a certain type of account. It is understood that the present disclosure includes, without limitation, financial accounts (e.g., savings, checking, credit card, debit card, mortgage, loan, brokerage, retirement, cryptocurrency accounts), service accounts (e.g., utilities and home security accounts), entertainment accounts (e.g., video streaming, gaming and entertainment), accounts used for holding commercially valuable content (e.g., data backups, music and video content, and digital archives), and others.

As described herein, data access control and account management are important and complex operations, which can incur significant financial and system resources to properly perform. Improper management of user accounts can present numerous risks to both users and organizations handling or hosting user data or other valuable content. Embodiments of the present disclosure provide systems and methods for data access control and account management that reduce these costs and risks, and improve efficiency, ease of user access, and account security while integrating with monitoring applications and administrative operations.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A data access control system, comprising:
a server containing a login database storing login credentials, the database including user login credentials for a user having an account; and
a processor, wherein, upon a determination that the user login credentials are potentially compromised, the processor is configured to apply a flag to the user login credentials, wherein the flag precludes the user from accessing the account,
wherein, upon submission of user login credentials by a first client device, the server is configured to:
record one or more network identifiers of the first client device in a device identification database, and
direct the first client device to a deflection site, wherein the deflection site has no access to account data associated with the user; and
wherein, upon a submission of the user login credentials by a second client device, the server is configured to:
record one or more network identifiers of the second client device in the device identification database,
determine if the one or more network identifiers of the second client device match the one or more network identifiers of the first client device, and
upon determining that the one or more network identifiers of the second client device do not match the one or more network identifiers of the first client device, present an authentication procedure via the second client device;
upon successful completion of the authentication procedure, require the user to perform a protective action; and
remove the flag applied to the user login credentials upon completion of the authentication procedure and performance of a protective action.

2. The data access control system of claim 1, wherein the server communicates with one or more remote servers through an application programming interface (API), and wherein the API is configured to apply the flag to the user login credentials and remove the flag from the user login credentials.

3. The data access control system of claim 1, wherein the protective action is at least one of changing a password, changing a user name, changing an access code, changing a swipe pattern, and changing a security question.

4. The data access control system of claim 1, wherein the protective action is establishing a form of biometric authentication.

5. The data access control system of claim 1, wherein the protective action is establishing two-factor authentication.

6. The data access control system of claim 5, wherein establishing two-factor authentication requires associating with the account at least one selected from the group of a telephone number, an email address, and a client device, wherein the at least one selected from the group of a telephone number, an email address, and a client device was not previously associated with the account.

7. The data access control system of claim 1, wherein the application of the flag to the user login credentials results in the transfer of the user login credentials from the login database to an access report database.

8. The data access control system of claim 7, wherein the one or more network identifiers of the first client device recorded in the device identification database include at least one selected from the group of an internet protocol address, a media access control address, a hardware address, an internet packet exchange address, and a netmask.

9. The data access control system of claim 7, wherein removal of the flag from the user login credentials results in the transfer of the user login credentials from the access report database to the login database.

10. The data access control system of claim 7, wherein the access report database contains a first table and a second table,
the first table contains fields for a category code, a category name, a category priority code, a category active status indicator, a user identifier, a time stamp, and a last update time stamp, and
the second table contains fields for a customer identifier, a category code, a user identifier, a time stamp, a last updating user identifier, and a last update time stamp.

11. The data access control system of claim 1, wherein upon determining that the one or more network identifiers of the second client device match the one or more network identifiers of the first client device, the server is further configured to direct the next submission of user login credentials by the second client device to the deflection site.

12. A method of data access control upon determining a first client device has submitted potentially compromised login credentials for a user, the method comprising:
applying a flag to all login credentials associated with the user in a login credentials database;
recording an identifier associated with the first client device into an access report database;
directing the first client device to a deflection site having no access to account data associated with the user;
receiving a submission of login credentials from a second client device,
recording an identifier associated with the second client device into the access report database,
determining that the identifier associated with the second client device is different than the identifier associated with the first client device, and
removing the flag from all login credentials associated with the user upon completion of an authentication procedure via the second client device and performance of a protective action via the second client device.

13. The method of data access control of claim 12, further comprising, prior to the removal of the flag and upon receipt of login credentials from a third client device associated with the user, directing the third client device to the deflection site.

14. The method of data access control of claim 12, further comprising, prior to the removal of the flag, presenting an authentication procedure to any client device that submits login credentials associated with the user.

15. The method of data access control of claim 12, wherein the protective action includes establishing multi-factor authentication by associating at least one of a telephone number, an email address, and a third client device with the account.

16. The method of data access control of claim 12, further comprising storing a copy of the potentially compromised login credentials in the access report database and associating the potentially compromised login credentials with the identifier associated with the first client device.

17. The method of data access control of claim 12, further comprising sending a notification to at least one of a telephone number and an email address associated with the account.

18. The method of data access control of claim 17, wherein the authentication procedure requires the submission of information relating to the notification by a second client device.

19. A data access control application programming interface (API), programmed to:
receive login credentials from a first client device, wherein the login credentials are associated with a user having an account;
receive a determination that the login credentials were potentially compromised;
upon receipt of the determination that the login credentials were fraudulently submitted, the API is programmed to:
record an identifier of the first client device and write the identifier of the first client device to an access report database;
flag all login credentials associated with the user and copy the login credentials to the access report database; and
direct the first client device to a deflection site having no access to account data associated with the user; and
upon submission of login credentials associated with the user from a second client device, the API is programmed to:
record an identifier of the second client device and write the identifier of the second client device to the access report database; and
upon a determination that the identifier of the second client device does not match the identifier of the first client device:
present an authentication procedure on the second client device;
require the performance of a protective action on the second client device; and
upon successful completion of the authentication procedure and successful performance of the protective action, remove the flag from all login credential associated with the user.

20. The data access control application programming interface of claim 19, wherein prior to the presentation of the authentication procedure, the API is further programmed to determine whether the second client device was previously associated with the account.

* * * * *